(12) United States Patent
Liu et al.

(10) Patent No.: US 11,117,687 B2
(45) Date of Patent: Sep. 14, 2021

(54) NEAR SPACE AIRCRAFT POD

(71) Applicant: HAIKOU INSTITUTE OF FUTURE TECHNOLOGY, Hainan (CN)

(72) Inventors: Ruopeng Liu, Guangdong (CN); Lin Luan, Guangdong (CN); Fan Feng, Guangdong (CN); Xiaohui Yao, Guangdong (CN); Shequan Zeng, Guangdong (CN)

(73) Assignee: HAIKOU INSTITUTE OF FUTURE TECHNOLOGY, Hainan (CN)

( * ) Notice: Subject to any disclaimer, the term of this patent is extended or adjusted under 35 U.S.C. 154(b) by 133 days.

(21) Appl. No.: 16/377,739

(22) Filed: Apr. 8, 2019

(65) Prior Publication Data
US 2019/0233139 A1 Aug. 1, 2019

Related U.S. Application Data

(63) Continuation of application No. PCT/CN2017/092010, filed on Jul. 6, 2017.

(30) Foreign Application Priority Data

Oct. 9, 2016 (CN) .......................... 201610881640.7

(51) Int. Cl.
*B64G 1/50* (2006.01)
*B64D 33/08* (2006.01)
*B64D 47/00* (2006.01)

(52) U.S. Cl.
CPC ............. *B64G 1/503* (2013.01); *B64D 33/08* (2013.01); *B64D 47/00* (2013.01)

(58) Field of Classification Search
CPC .......... B64G 1/503; B64G 1/58; B64D 33/08; B64D 47/00

(Continued)

(56) References Cited

U.S. PATENT DOCUMENTS 4,919,366 A * 4/1990 Cormier .................... B64C 1/38
   220/592.21
5,732,765 A * 3/1998 Drolen ..................... B64G 1/50
   165/41

(Continued)

FOREIGN PATENT DOCUMENTS

CA        960201 A      12/1974
CN     201860049 U       6/2011

(Continued)

OTHER PUBLICATIONS

English translation of International Search Report dated Oct. 12, 2017 for Chinese PCT Application No. PCT/CN2017/092010 filed Jul. 6, 2017, 3 pages.

(Continued)

*Primary Examiner* — Brady W Frazier
(74) *Attorney, Agent, or Firm* — Armstrong Teasdale LLP

(57) ABSTRACT

A near space aircraft pod, including a pod body and a covering piece, where a heat dissipation part is disposed on the pod body for dissipating heat inside the pod body; and the covering piece is connected to the outside of the pod body in a movable manner, for covering the heat dissipation part or keeping a pre-designed distance from the heat dissipation part. According to the near space aircraft pod provided in the embodiments, the covering piece can adjust a distance from the heat dissipation part in time or cover the heat dissipation part based on a temperature change. Therefore, a heat dissipation speed of the pod can be effectively controlled, so that temperature inside the pod is kept in a proper range, and it is ensured that electronic devices in the pod operate under a good temperature environment.

18 Claims, 2 Drawing Sheets

(58) Field of Classification Search
USPC .................................................... 244/171.8
See application file for complete search history.

(56) References Cited

U.S. PATENT DOCUMENTS

| | | | | |
|---|---|---|---|---|
| 5,794,890 | A * | 8/1998 | Jones, Jr. | F28D 15/0275 244/171.8 |
| 6,003,817 | A * | 12/1999 | Basuthakur | B64G 1/50 244/164 |
| 6,776,220 | B1 * | 8/2004 | Low | B64G 1/506 165/104.33 |
| 7,028,953 | B2 * | 4/2006 | Sebata | B64G 1/503 244/171.8 |
| 7,874,520 | B2 * | 1/2011 | McKinnon | B64G 1/503 244/171.8 |
| 8,240,612 | B2 * | 8/2012 | Jondeau | B64G 1/506 244/171.8 |
| 8,960,608 | B2 * | 2/2015 | Goodzeit | B23P 15/26 244/171.8 |
| 2003/0089484 | A1 * | 5/2003 | Biter | B64G 1/503 165/41 |
| 2008/0289801 | A1 * | 11/2008 | Batty | B64G 1/503 165/104.14 |
| 2010/0187364 | A1 * | 7/2010 | Kutter | B64G 1/54 244/171.7 |
| 2012/0170227 | A1 * | 7/2012 | Bayliss | B64D 47/00 361/727 |
| 2014/0158824 | A1 * | 6/2014 | L'Heritier | B64D 47/00 244/118.1 |
| 2015/0314894 | A1 * | 11/2015 | Mazed | B64G 1/62 244/171.7 |
| 2016/0200460 | A1 * | 7/2016 | Aston | B32B 5/26 244/171.7 |
| 2016/0297552 | A1 * | 10/2016 | Moser | B64G 1/58 |
| 2017/0036783 | A1 * | 2/2017 | Snyder | B29C 64/118 |
| 2017/0160021 | A1 * | 6/2017 | Cognata | B64G 1/503 |
| 2017/0320600 | A1 * | 11/2017 | Cruijssen | B64G 1/222 |
| 2017/0361951 | A1 * | 12/2017 | Walker | B64G 1/402 |
| 2019/0071193 | A1 * | 3/2019 | Izu | B64G 1/58 |

FOREIGN PATENT DOCUMENTS

| | | |
|---|---|---|
| CN | 103115441 A | 5/2013 |
| CN | 103270911 A | 9/2013 |
| CN | 205314809 U | 6/2016 |
| CN | 205319547 U | 6/2016 |
| RU | 2368463 C2 | 9/2009 |

OTHER PUBLICATIONS

European Search Report for corresponding EP17857781 dated Apr. 22, 2020, 5 Pages.

* cited by examiner

NEAR SPACE AIRCRAFT POD

CROSS-REFERENCE TO RELATED APPLICATIONS

This application is a continuation application of PCT/CN2017/092010, filed Jul. 6, 2017, published as WO 2018/064900, which claims the priority of Chinese Application No. 201610881640.7, filed Oct. 9, 2016. The contents of the above-identified applications are incorporated herein by reference in their entireties.

TECHNICAL FIELD

The disclosed implementations relates to the field of aircraft technologies, and more specifically, to a near space aircraft pod.

BACKGROUND

Near space generally refers to airspace 20-100 km above the ground, and attracts worldwide attention because of its important development and application value. A near space aircraft is an aircraft that only flies or that can fly in the near space in a long-term and continuous manner, or a sub-orbital aircraft, or a hypersonic cruise aircraft that flies in the near space, has advantages that aerospace vehicles do not have, and particularly, has a significant development potential in the communication support, information collection, electronic suppression, warning, and civil use fields.

Various electronic devices of the near space aircraft are centralized in a pod, causing a very large heating power in the pod. A basic condition under which the electronic devices in the pod can operate properly is: The pod needs to provide a relatively stable temperature environment. Because the near space includes the stratosphere, the mesosphere, and the thermosphere, ambient temperature in the pod is greatly affected by environmental temperature, atmospheric pressure, atmospheric density, and solar radiation of the near space. In the pod, temperature may be excessively high in the daytime and excessively low in the nighttime. Because energy management of the near space craft is very strict and intense, an active temperature control strategy such as cooling by using an air conditioner is not suitable for the pod. Therefore, at the present stage, thermal insulation and heat dissipation requirements of the pod of the near space aircraft are relatively challenging.

SUMMARY

In view of this, an objective of the present invention is to provide a near space aircraft pod in which a heat dissipation speed can be effectively controlled.

According to the embodiments, a near space aircraft pod is provided, including a pod body and a covering piece, where a heat dissipation part is disposed on the pod body for dissipating heat inside the pod body; and the covering piece is connected to the outside of the pod body in a movable manner, for covering the heat dissipation part or keeping a pre-designed distance from the heat dissipation part.

In one embodiment, the near space aircraft pod according to claim 1, further comprising at least one driving device connected to the covering piece (2), and is configured to drive the covering piece (2) to move in a direction away from and a direction close to the heat dissipation part (11).

In one embodiment, the near space aircraft pod according to claim 1, wherein the driving device is fixed inside the pod body (1).

In one embodiment, the driving device includes a motor and a gear and rack drive, a power output end of the motor is connected to a gear of the gear and rack drive, and a free end of a rack of the gear and rack drive is connected to the covering piece.

In one embodiment, the motor is a stepper motor or a servo motor.

In one embodiment, the near space aircraft pod according to claim 2, wherein the driving device is a pneumatic apparatus.

In one embodiment, a connecting rod is further disposed between the rack and the covering piece, to connect the free end of the rack to the covering piece.

In one embodiment, the near space aircraft pod further includes a temperature control unit configured to control temperature inside the pod body.

In one embodiment, the temperature control unit is located inside the pod body (1), and is electrically connected to the driving device.

In one embodiment, the temperature control unit includes a control box and a temperature sensor electrically connected to the control box; the temperature sensor collects a temperature signal inside the pod body, and transfers a control instruction to the driving device.

In one embodiment, the heat dissipation part is formed by a thermally conductive material.

In one embodiment, the thermally conductive material is metal.

In one embodiment, thermal control coatings are respectively disposed on an outer surface of the pod body other than the heat dissipation part and an outer surface of the covering piece; the thermal control coatings are configured to reduce absorption of solar radiation energy inside the pod body, and accelerate heat dissipation inside the pod body.

In one embodiment, the thermal control coatings are aluminum foil coatings.

In one embodiment, an exterior shape of the pod body is similar to a cuboid structure.

In one embodiment, the heat dissipation part is disposed on a top wall of the pod body.

In one embodiment, a shape of the covering piece matches a shape of the heat dissipation part, so that the covering piece can be closed on the heat dissipation part.

In one embodiment, the near space aircraft pod according to claim 1, wherein the heat dissipation part (11) is designed as one outer wall of the pod body.

In one embodiment, a plurality of heat sinks are disposed on the heat dissipation part.

In one embodiment, the heat dissipation part protrudes from an outer surface of the pod body.

According to the near space aircraft pod provided in the present invention, the covering piece can adjust a distance from the heat dissipation part in time or cover the heat dissipation part based on a temperature change. Therefore, a heat dissipation speed of the pod can be effectively controlled, so that temperature inside the pod is kept in a proper range, and it is ensured that electronic devices in the pod operate under a good temperature environment.

BRIEF DESCRIPTION OF DRAWINGS

The following descriptions of the embodiments of the present invention with reference to the accompanying drawings make the foregoing and other objectives, features, and advantages of the present invention clearer.

DESCRIPTION OF EMBODIMENTS

Figure 1:
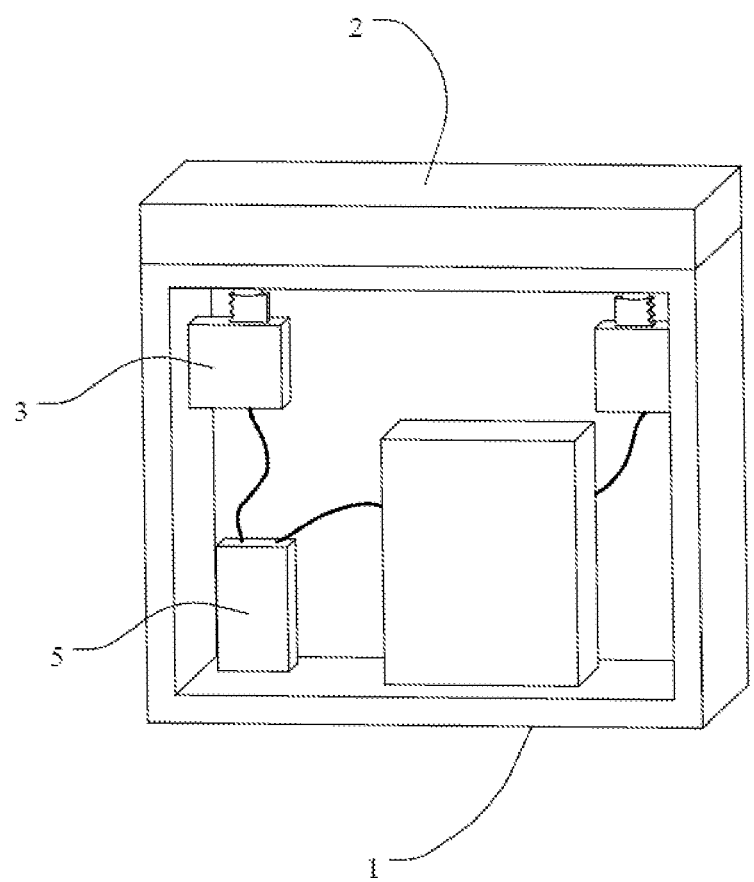
FIG. 1 is a schematic solid structural diagram of a near space aircraft pod in an interval thermal insulation state according to an embodiment.

The following describes the embodiments in a more detailed manner with reference to the accompanying drawings. In the drawings, a same component is represented by using a same sign or similar signs. For clarity, parts in the drawings are not drawn in proportion.

Figure 2:
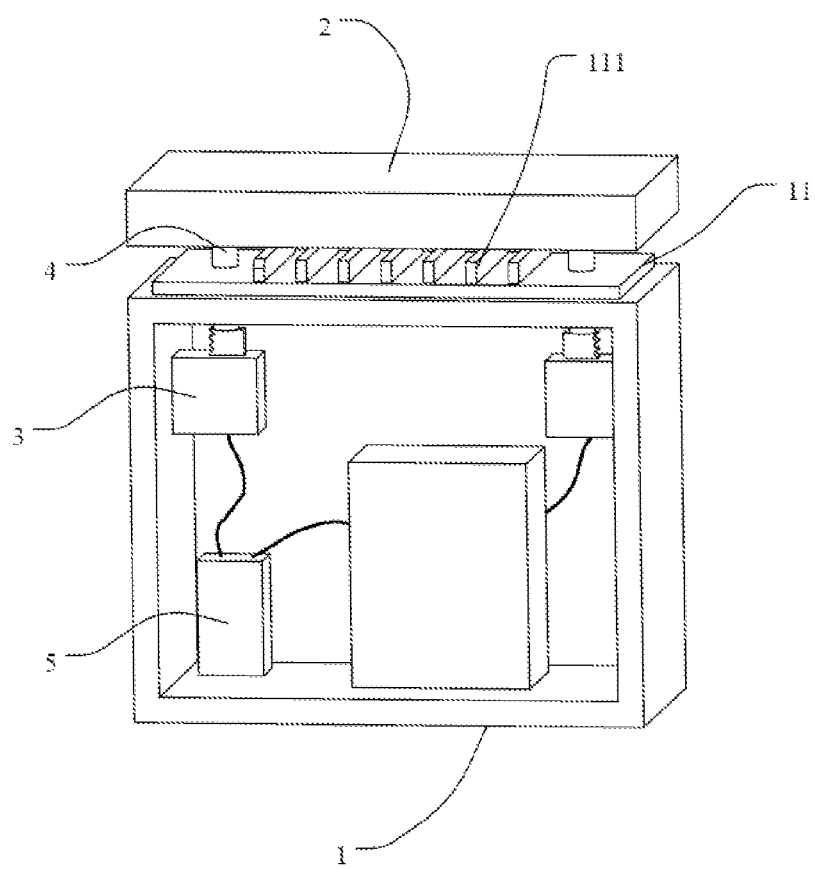
FIG. 2 is a schematic solid structural diagram of a near space aircraft pod in a heat dissipation state according to an embodiment.

FIG. 1 and FIG. 2 show a near space aircraft pod according to an embodiment. As shown in FIG. 1 and FIG. 2, the near space aircraft pod includes a pod body 1 and a covering piece 2. Accommodation space for electronic devices and the like is formed inside the pod body 1. A heat dissipation part 11 is disposed on the pod body 1 for dissipating heat inside the pod body 1. The covering piece 2 is connected to the outside of the pod body 1 in a movable manner, for covering the heat dissipation part 11 or keeping a pre-designed distance from the heat dissipation part 11.

The near space aircraft pod includes a driving device connected to the covering piece 2. The driving device is fixed inside the pod body 1, and is configured to drive the covering piece 2 to move.

In an embodiment, the driving device includes a motor (not shown in the figure) and a gear and rack drive 3. A power output end of the motor is connected to a gear of the gear and rack drive 3, and a free end of a rack of the gear and rack drive 3 is connected to the covering piece 2. A connecting rod 4 is further disposed between the rack and the covering piece 2. The connecting rod 4 passes through the heat dissipation part 11. The free end of the rack is connected to the covering piece 2 by using the connecting rod 4.

In an embodiment, the motor is a stepper motor or a servo motor. In this way, the motor may control a distance between the covering piece and the heat dissipation part based on a requirement for a heat dissipation speed. For example, when fast heat dissipation is required, the motor controls the rack of the gear and rack drive 3 to move, and the rack drives the covering piece 2 to move relatively far away from the heat dissipation part, thereby implementing fast heat dissipation.

In an alternative embodiment, the driving device may be a pneumatic apparatus. For example, a cylinder is fixed on an inner wall of the pod body 1, and a piston rod of the cylinder is connected to the covering piece, to drive the covering piece 2 to move.

A plurality of, for example, two or four, driving devices may be disposed depending on a requirement. Two driving devices are disposed in this embodiment.

A temperature control unit is further disposed in the pod body 1, and the temperature control unit is electrically connected to the driving device. The temperature control unit includes a control box 5 and a temperature sensor (not shown in the figure) electrically connected to the control box 5. The temperature sensor is configured to collect a temperature signal inside the pod body 1, and transfer a control instruction to the driving device, to drive, in real time based on a temperature change status, the covering piece 2 to move.

Referring to FIG. 2, a first preset value and a second preset value for temperature control may be set by using the temperature control unit, for example, are −5° C. and 50° C. respectively. When temperature in the pod body 1 is higher than the second preset value, the control box 5 transmits a start command to the driving device, to drive the covering piece 2 away from the heat dissipation part 11, so that air flows through the heat dissipation part 11 and quickly takes away heat in the pod body 1. Referring to FIG. 1, when temperature in the pod body 1 is lower than the first preset value, the control box 5 transmits a stop command to the driving device, so that the covering piece 2 is closed and covers the heat dissipation part 11, thereby preventing heat dissipation in the pod body 1. Certainly, a temperature-open/close distance change curve may also be set by using the temperature control unit. By using a temperature value in the pod body 1, a distance between the covering piece 2 and the heat dissipation part 11 is adjusted at any time, so as to control a heat dissipation speed. Details are not described herein again.

In one embodiment, an exterior shape of the pod body 1 is similar to a cuboid box-type structure, and the heat dissipation part 11 is disposed on a top wall of the pod body 1. A person skilled in the art should understand that a shape of the pod body is not limited to a cuboid, and may be any shape such as a spherical, an ellipsoidal, or a cylindrical shape.

The heat dissipation part 11 is disposed on an outer wall of the pod body 1, and is configured to implement heat exchange between the inside of the pod body 1 and an external environment. In a preferred solution, the heat dissipation part 11 protrudes from an outer surface of the pod body 1, and a plurality of heat sinks 111 are disposed on the heat dissipation part 11, to improve heat exchange efficiency. Certainly, the heat dissipation part 11 may be disposed as one outer wall of the pod body 1. In this case, the heat dissipation part 11 is in direct contact with internal space of the pod body 1.

Figure 3:
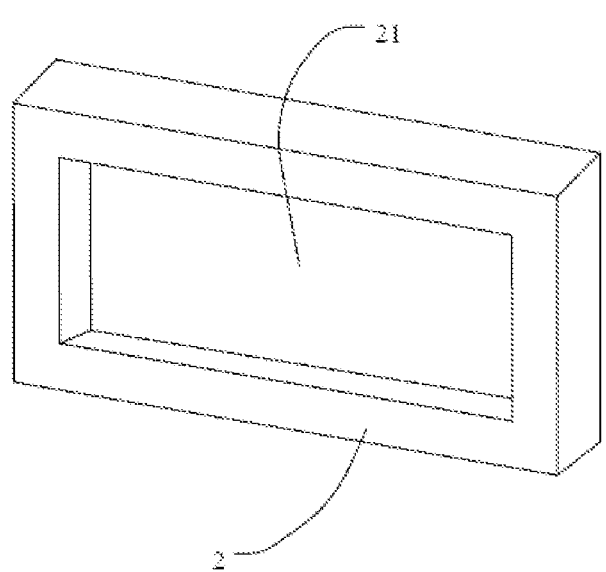
FIG. 3 is a schematic structural diagram of a covering piece of a near space aircraft pod according to an embodiment.

Referring to FIG. 3, correspondingly, the covering piece 2 is a lid-shape structure. A concave part 21 is disposed on the covering piece 2. A shape of the concave part 21 matches the heat dissipation part 11, so that the covering piece 2 can be closed on the heat dissipation part 11. Further, a plurality of accommodation grooves (not shown in the figure) may be disposed on the concave part 21 for the heat sinks 111, and are configured to respectively accommodate corresponding heat sinks 111, so that after the covering piece 2 is closed on the heat dissipation part 11, the covering piece 2 can fully cover the heat dissipation part 11, and the heat sinks 111 can be respectively accommodated into the accommodation groove, thereby better maintaining a temperature environment in the pod body 1.

The heat dissipation part 11 is formed by a thermally conductive material, which may be metal but is not limited to metal, for example, an aluminum material.

Thermal control coatings (not shown in the figure) are respectively disposed on an outer surface of the pod body other than the heat dissipation part and an outer surface of the covering piece 2, and the thermal control coatings are configured to reduce absorption of solar radiation energy inside the pod body 1, and accelerate heat dissipation inside the pod body 1. In this way, the pod body 1 and the covering piece 2 have relatively high emissivity and relatively low solar absorptivity, so that heat generated by electronic devices in the pod body is dissipated out of the pod body in time, and a sudden temperature rise in the pod caused by exposure to external sunlight is reduced to the greatest extent. In one embodiment, the thermal control coatings are aluminum foil coatings.

In a flying process of a near space aircraft, when temperature in the pod body increases because the electronic devices in the pod body 1 generate much heat after long-time operation, the temperature sensor transmits a detected temperature value to the temperature control unit. The temperature control unit sends a start command to the driving device, to drive the covering piece 2 to move away from the heat dissipation part for a pre-designed distance, for heat dissipation of the pod. When the temperature sensor detects that the temperature in the pod body 1 decreases to a pre-designed value, for example, when the temperature suddenly decreases in the nighttime, the temperature control unit sends a command to the driving device, to drive the covering piece 2 to close in a direction towards the heat dissipation part and cover the heat dissipation part or reduce a distance from the heat dissipation part 11. In this way, a speed at which air flows through the heat dissipation part is reduced, thereby reducing a heat loss of the pod body.

According to the near space aircraft pod provided in the embodiments, the covering piece can adjust a distance from the heat dissipation part in time or cover the heat dissipation part based on a temperature change. Therefore, a heat dissipation speed of the pod can be effectively controlled, so that temperature inside the pod is kept in a proper range, and it is ensured that electronic devices in the pod operate under a good temperature environment.

It should be noted that, in this specification, relational terms such as first and second are merely used to distinguish between an entity or operation from another entity or operation, but do not necessarily require or imply that there is any such an actual relationship or sequence between these entities or operations. Moreover, terms "including", "having", and any other variant thereof are intended to cover a non-exclusive inclusion. For example, a process, a method, a product, or a device that includes a series of elements is not necessarily limited to those elements, but may include other elements that are not expressly listed or that are inherent to such a process, method, product, or device. Without more limitations, for an element limited by a phrase "including a . . . ", it is possible that another same element also exists in a process, a method, a product, or a device that includes the element.

Finally, it should be noted that, apparently, the foregoing embodiments are merely examples used to clearly describe the present invention, but are not intended to limit implementations. A person of ordinary skill in the art may still make changes or variations in other different forms based on the foregoing descriptions. It is unnecessary and also unable to completely list all implementations herein. Any variations or changes readily figured out from the foregoing descriptions still fall within the protection scope of the present invention.

What is claimed is:

1. A near space aircraft pod, comprising
a pod body, wherein a heat dissipation part is disposed on the pod body for dissipating heat inside the pod body;
a covering piece, which is connected to the outside of the pod body in a movable manner, for covering the heat dissipation part or keeping a pre-designed distance from the heat dissipation part, so as to control a heat dissipation speed of the near space aircraft pod; and
at least one driving device, the at least one driving device comprising a plurality of connecting rods which are connected to the covering piece and are configured to drive the covering piece in a translating manner to move in a direction away from and a direction close to the heat dissipation part.

2. The near space aircraft pod according to claim 1, wherein the driving device is fixed inside the pod body.

3. The near space aircraft pod according to claim 1, wherein the driving device comprises a motor and a gear and rack drive, a power output end of the motor is connected to a gear of the gear and rack drive, and a free end of a rack of the gear and rack drive is connected to the covering piece by one of the plurality of connecting rods.

4. The near space aircraft pod according to claim 3, wherein the motor is a stepper motor or a servo motor.

5. The near space aircraft pod according to claim 1, wherein the driving device is a pneumatic apparatus.

6. The near space aircraft pod according to claim 5, further comprising a temperature control unit configured to control temperature inside the pod body.

7. The near space aircraft pod according to claim 6, wherein the temperature control unit is located inside the pod body, and is electrically connected to the driving device.

8. The near space aircraft pod according to claim 6, wherein the temperature control unit comprises a control box and a temperature sensor electrically connected to the control box; the temperature sensor collects a temperature signal inside the pod body, and transfers a control instruction to the driving device.

9. The near space aircraft pod according to claim 5, wherein the heat dissipation part is formed by a thermally conductive material.

10. The near space aircraft pod according to claim 9, wherein the thermally conductive material is metal.

11. The near space aircraft pod according to claim 5, further comprising thermal control coatings, respectively disposed on an outer surface of the pod body other than the heat dissipation part and an outer surface of the covering piece; the thermal control coatings are configured to reduce absorption of solar radiation energy inside the pod body, and accelerate heat dissipation inside the pod body.

12. The near space aircraft pod according to claim 11, wherein the thermal control coatings are aluminum foil coatings.

13. The near space aircraft pod according to claim 5, wherein an exterior shape of the pod body is similar to a cuboid structure.

14. The near space aircraft pod according to claim 5, wherein the heat dissipation part is disposed on a top wall of the pod body.

15. The near space aircraft pod according to claim 5, wherein a shape of the covering piece matches a shape of the heat dissipation part, so that the covering piece can be closed on the heat dissipation part.

16. The near space aircraft pod according to claim 5, wherein the heat dissipation part is designed as one outer wall of the pod body.

17. The near space aircraft pod according to claim 5, wherein a plurality of heat sinks are disposed on the heat dissipation part.

18. The near space aircraft pod according to claim 5, wherein the heat dissipation part protrudes from an outer surface of the pod body.

* * * * *